Jan. 8, 1924.
S. L. EVERHART
CUSHION TIRE
Original Filed May 15, 1920
1,480,201
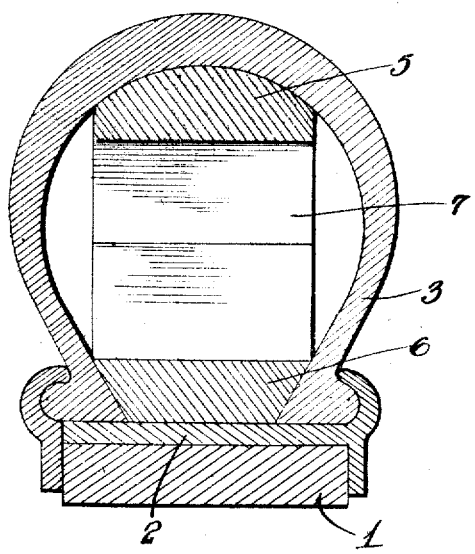
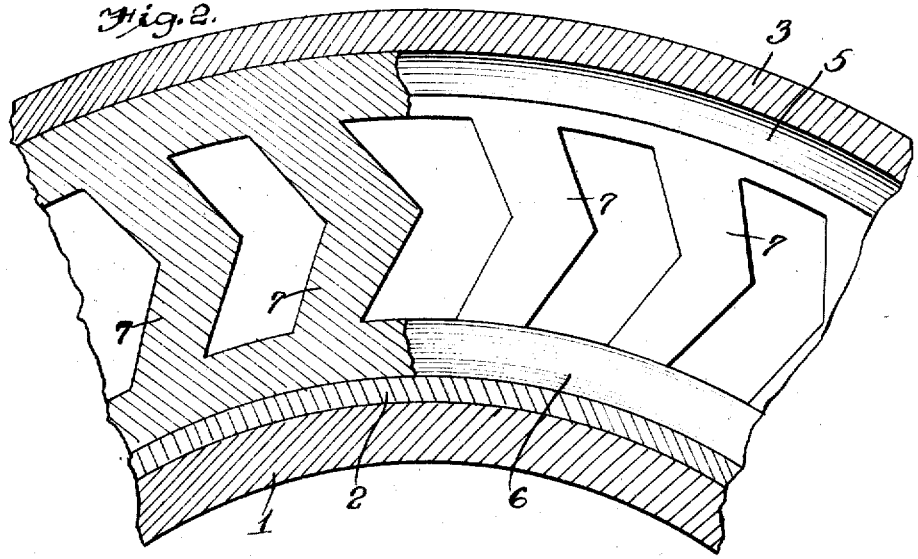
INVENTOR
Stuart L. Everhart
BY
ATTORNEY.

Patented Jan. 8, 1924.

1,480,201

UNITED STATES PATENT OFFICE.

STUART L. EVERHART, OF DOWAGIAC, MICHIGAN.

CUSHION TIRE.

Application filed May 15, 1920, Serial No. 381,539. Renewed June 13, 1923.

*To all whom it may concern:*

Be it known that I, STUART L. EVERHART, a citizen of the United States, residing at Dowagiac, in the county of Cass and State of Michigan, have invented certain new and useful Improvements in a Cushion Tire, of which the following is a specification.

This invention relates to tires and more particularly to the class of cushion tires for vehicle wheels.

The primary object of the invention is to provide a tire which will possess the desired resiliency for absorbing shocks and jars incident to the irregularity in the surface of the roadway without the use of the pneumatic tubes within the tire.

Another object of the invention is to provide a tire which will have all of the outward appearances of being a pneumatic tire but which will have the invention arranged in the outer casing of the tire so that the desired resiliency will be produced and the necessity of inflating the tire will be obviated.

The invention further aims to provide an inner resilient structure of rubber constructed of coacting sections for the purpose of producing resiliency but arranged so that lateral distortion of the yieldable sections will not be permitted.

Other objects of the invention will appear upon consideration of the following detailed description and accompanying drawings, wherein:—

Figure 1 is a transverse section of the tire constructed in accordance with my invention, and Figure 2 is a longitudinal section showing part of the inner structure in elevation.

In the drawings illustrating the preferred embodiment of the invention the wheel rim 1 may be of any preferred construction and is provided with the usual demountable rim 2 such as is commonly employed on automobile wheels. The outer casing or shoe 3 is held in position by the rim structure in the usual manner and it will be understood that the invention will be adapted for any size tires and may be used on light and heavy vehicles by merely changing the relative proportions of the parts which constitute the structure.

The resilient member which takes the place of the ordinary inner tube is mounted within the tire casing 3 and consists of the outer annular section 5 and the inner rim engaging section 6. The inner section 6 is arranged between the side portions of the tire casing having its edges beveled so as to snugly fit the space between the side portions to maintain the section in position centrally with respect to the tire shoe. The outer section 5 engages the inner surface of the shoe at a point directly beneath the tread thereof. These sections may be of any desired thickness and width according to the type of vehicle upon which they are to be used and it will be obvious that the parts may be constructed of any suitable material.

The two sections 5 and 6 are radially spaced apart so that an annular space intervenes between the two sections. Integrally formed with the two annular sections 5 and 6 are the intermediate supporting members 7 through the medium of which the desired resiliency is obtained. These members are preferably constructed of rubber having the desired resiliency and are integrally moulded with the annular sections 5 and 6 as shown in Fig. 2. The members 7 are V-shaped and their apexes extend circumferentially through the intervening space between the annular sections so that the members 7 are always disposed at an angle as shown. The supporting members 7 are all of the same thickness according to the size of the tire and are of equal width and since these sections are disposed edgewise it will be obvious that only a radial resiliency will occur and lateral distortion will be prevented. Therefore the swaying of the vehicle and irregularities in the roadway will not cause lateral bending or bulging of the tire shoe.

Due to their V-shaped formation, however, and the flexible material from which they are constructed, the members 7 are free to flex radially whereby the two sections 5 and 6 may move toward and away from each other within the tire shoe when a weight is supported thereby as when the tire is mounted upon a vehicle wheel. Particular stress is laid on the circumferentially projecting V-shaped supporting members 7 disposed within the space between the two annular sections 5 and 6 so that only a radial flexing of the members is permitted but no lateral bulging will occur.

What I claim is:—

A tire filler comprising radially spaced resilient annular sections, substantially V-shaped supporting members vertically arranged between the said sections in spaced relation and integrally formed therewith, said members having their apexes intermediate the sections and projecting in circumferential alignment with each other whereby radial flexing of said members will be permitted.

In testimony whereof, I have affixed my signature in the presence of two witnesses.

STUART L. EVERHART.

Witnesses:
 ALBERT B. FRISBIE,
 JOSEPH H. MEADE.